(12) United States Patent
Mori et al.

(10) Patent No.: US 8,191,692 B2
(45) Date of Patent: Jun. 5, 2012

(54) CYLINDER APPARATUS

(75) Inventors: Masatoshi Mori, Kanagawa (JP);
Satsuki Yamamoto, Kanagawa (JP)

(73) Assignees: Nissan Motor Co., Ltd., Yokohama-shi (JP); Hitachi, Ltd., Tokyo (JP)

( * ) Notice: Subject to any disclaimer, the term of this patent is extended or adjusted under 35 U.S.C. 154(b) by 1322 days.

(21) Appl. No.: 11/892,413

(22) Filed: Aug. 22, 2007

(65) Prior Publication Data

US 2008/0088070 A1 Apr. 17, 2008

(30) Foreign Application Priority Data

Aug. 25, 2006 (JP) ................................. 2006-229115

(51) Int. Cl.
*F16F 9/48* (2006.01)

(52) U.S. Cl. ..................... 188/284; 267/220; 267/179

(58) Field of Classification Search .................. 188/284; 267/220, 179

See application file for complete search history.

(56) References Cited

U.S. PATENT DOCUMENTS

| | | | | |
|---|---|---|---|---|
| 4,448,424 A | * | 5/1984 | Ernst | 277/411 |
| 4,995,623 A | * | 2/1991 | Wada et al. | 277/552 |
| 6,843,481 B1 | * | 1/2005 | Kittock et al. | 277/411 |
| 7,252,031 B2 | * | 8/2007 | Nakamura et al. | 92/85 A |
| 2005/0016805 A1 | * | 1/2005 | Brehm et al. | 188/315 |
| 2006/0027431 A1 | * | 2/2006 | Fukushima et al. | 188/284 |

FOREIGN PATENT DOCUMENTS

| | | |
|---|---|---|
| JP | 6-012848 U | 2/1994 |
| JP | 7-35187 A | 2/1995 |
| JP | 2006-177531 A | 7/2006 |

* cited by examiner

*Primary Examiner* — Bradley King
(74) *Attorney, Agent, or Firm* — Foley & Lardner LLP

(57) ABSTRACT

In a cylinder apparatus in the form of a shock absorber, a spring seat is mounted within a cylinder, and clearance-fitted to a piston rod with a first lateral clearance for moving along the piston rod longitudinally of the cylinder. The spring seat includes a longitudinal extension at one longitudinal end for defining a space between the longitudinal extension and the piston rod. A rebound spring is mounted around the piston rod within the cylinder. The rebound spring has one longitudinal end fixed to another longitudinal end of the spring seat. An elastic member is retained in the defined space by the longitudinal extension of the spring seat, and clearance-fitted to the piston rod with a second lateral clearance for moving along the piston rod longitudinally of the cylinder, wherein the second lateral clearance is smaller than the first lateral clearance.

19 Claims, 3 Drawing Sheets

CYLINDER APPARATUS

BACKGROUND OF THE INVENTION

The present invention relates to a cylinder apparatus including: a cylinder; a piston mounted within the cylinder for sliding longitudinally of the cylinder; a piston rod coupled to the piston, and arranged to extend through one longitudinal end of the cylinder; and a spring mounted around the piston rod within the cylinder.

Japanese Utility Model No. 6-12848 discloses a shock absorber including: a cylinder; a piston mounted within the cylinder for sliding longitudinally of the cylinder; a piston rod coupled to the piston, and arranged to extend through one longitudinal end of the cylinder; and a spring mounted around the piston rod within the cylinder. The spring, which is referred to as rebound spring, is press-fitted at both longitudinal ends to respective spring seats made of resin. These spring seats are supported for moving along the piston rod longitudinally of the cylinder. An elastic member in the form of a ring, which is referred to as rebound rubber, is mounted on the back side (opposite to the rebound spring) of each of the spring seats. When a vehicle wheel to which the shock absorber is applied is rebounded so that the piston rod travels in the direction to contract the rebound spring, one of the spring seats comes into contact with one end (rebound seat, and rod guide) of the cylinder through the rebound rubber. This is intended for preventing the spring seat from coming into collision with the end of the cylinder, and thereby preventing the resulting noise.

SUMMARY OF THE INVENTION

According to the shock absorber disclosed in Japanese Utility Model No. 6-12848, it may be possible to reduce a noise resulting from a collision between the spring seat and the end of the cylinder. However, it may be possible to cause a noise resulting from a collision between the spring seat and the piston rod as follows. In the shock absorber, the piston rod extends through the center hole of the spring seat. The inner lateral peripheral surface of the spring seat is clearance-fitted to the outer lateral peripheral surface of the piston rod with a specific clearance so that the spring seat may move along the piston rod longitudinally of the cylinder. When the rebound spring vibrates, then the spring seat may move in the lateral direction and collide with the piston rod so as to cause a noise.

Accordingly, it is desirable to minimize such a noise resulting from a contact between such a spring seat and such a piston rod.

According to one aspect of the present invention, a cylinder apparatus comprises: a cylinder; a piston mounted within the cylinder for sliding longitudinally of the cylinder; a piston rod coupled to the piston, and arranged to extend through one longitudinal end of the cylinder; a spring seat mounted within the cylinder, and clearance-fitted to the piston rod with a first lateral clearance for moving along the piston rod longitudinally of the cylinder, the spring seat including a longitudinal extension at one longitudinal end for defining a space between the longitudinal extension and the piston rod; a spring mounted around the piston rod within the cylinder, the spring having one longitudinal end fixed to another longitudinal end of the spring seat; and an elastic member retained in the defined space by the longitudinal extension of the spring seat, and clearance-fitted to the piston rod with a second lateral clearance for moving along the piston rod longitudinally of the cylinder, wherein the second lateral clearance is smaller than the first lateral clearance.

DETAILED DESCRIPTION OF THE INVENTION

Figure 1:
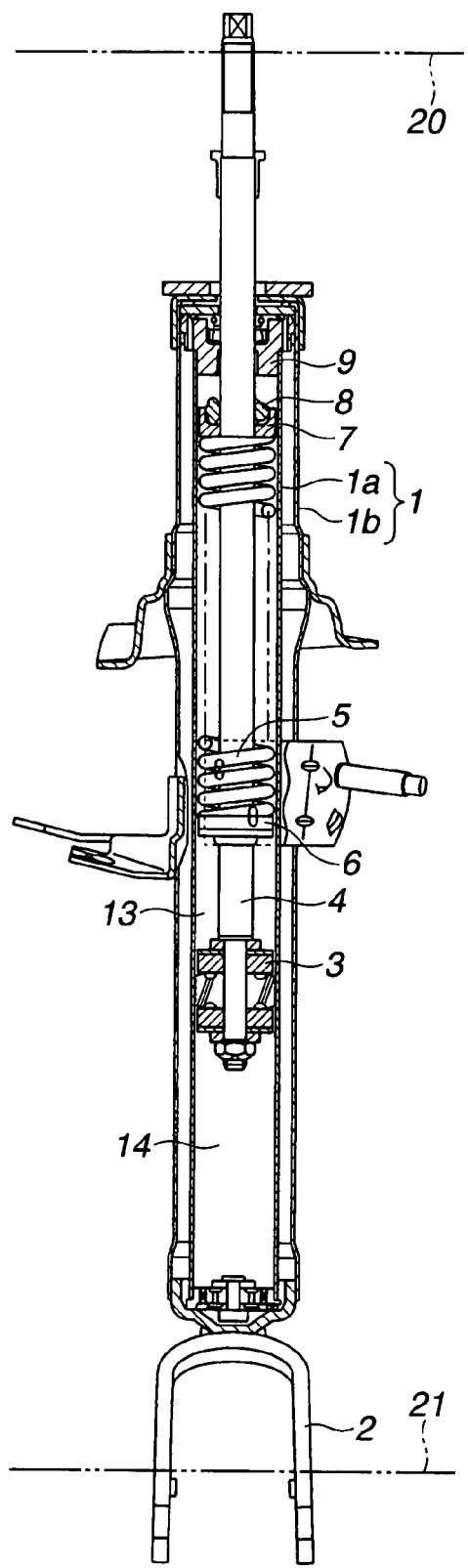
FIG. 1 is a longitudinal sectional view of a cylinder apparatus according to an embodiment of the present invention.
Figure 2:
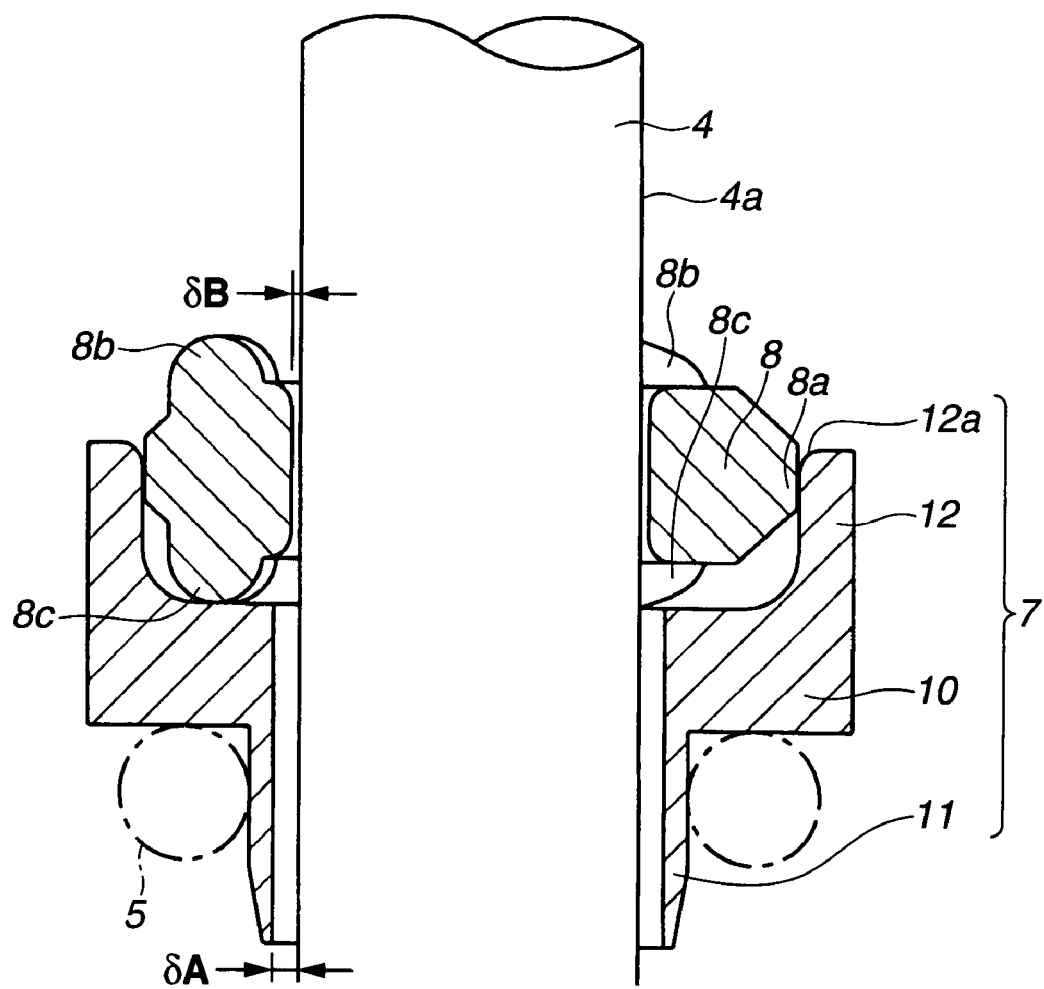
FIG. 2 is an enlarged partial longitudinal sectional view of the cylinder apparatus according to the embodiment.
Figure 3:
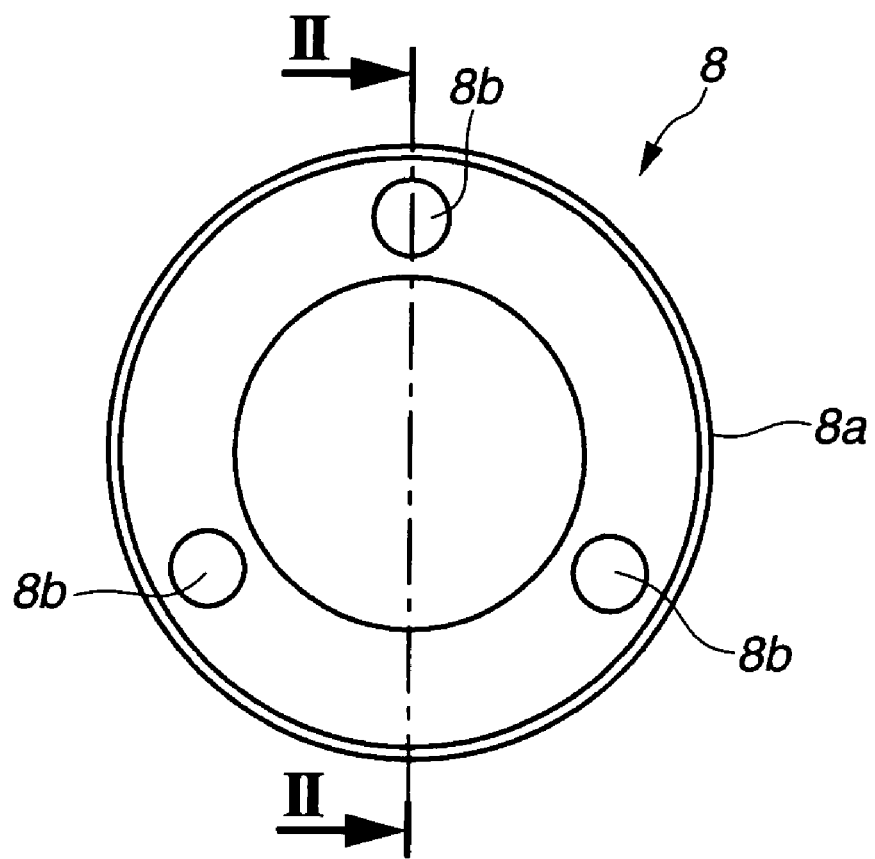
FIG. 3 is a plan view of a stopper rubber of the cylinder apparatus according to the embodiment as separated.

The following describes a cylinder apparatus in the form of a shock absorber for a motor vehicle according to an embodiment of the present invention with reference to FIGS. 1 to 3. For ease of understanding, various directional terms, such as, right, left, upper, lower, rightward and the like are used in the following description. However, such terms are to be understood with respect to the drawings on which corresponding part or portion is shown. The shock absorber is of a twin-tube type. Specifically, a cylinder 1 includes a cylindrically-shaped inner tube 1a and a cylindrically-shaped outer tube 1b surrounding the inner tube 1a. Cylinder 1 is mounted at its lower end through a bracket 2 to a member 21 of an unsprung part such as a knuckle or a suspension arm. A cylindrically-shaped piston 3 is mounted within inner tube 1a for sliding longitudinally of inner tube 1a, separating the inner space of inner tube 1a into an upper chamber 13 and a lower chamber 14. A cylindrically-shaped piston rod 4 is coupled at its lower end to piston 3. Piston rod 4 extends through upper chamber 13 and the upper end portion (including a rod guide 9) of cylinder 1 to outside of cylinder 1. Piston rod 4 is mounted at its upper end to a member 20 of a sprung part such as a frame of a vehicle body.

A cylindrically coiled spring 5, which is referred to as rebound spring, is mounted within upper chamber 13, extending longitudinally of cylinder 1. Rebound spring 5 is mounted around piston rod 4. Piston rod 4 longitudinally extends through the inner cylindrical space of rebound spring 5. In the present embodiment, rebound spring 5 is fixed at its lower end to piston rod 4, and is movably supported at its upper end. The lower end of rebound spring 5 is press-fitted to a fixed spring seat 6 which is fixed to piston rod 4. The upper end of rebound spring 5 is press-fitted to a free spring seat 7 which is mounted within cylinder 1 and supported for sliding along piston rod 4 at least in the longitudinal direction of cylinder 1.

The following describes the structure of the free upper end of rebound spring 5 in detail with reference to FIG. 2. Free spring seat 7 is in the form of a ring, and is made of resin. Free spring seat 7 includes a base portion 10, an inserted portion 11, an outer peripheral longitudinal extension 12. Base portion 10, inserted portion 11, and outer peripheral longitudinal extension 12 are formed integrally with each other to form free spring seat 7. Base portion 10 is in the form of a tube. Inserted portion 11 in the form of a tube extends downwardly from the inner lateral periphery of the lower end of base portion 10. Outer peripheral longitudinal extension 12 in the form of a tube extends upwardly from the outer lateral periphery of the upper end of base portion 10. Inserted portion 11 is inserted into the inner cylindrical space of rebound spring 5, and fitted to the inner lateral face of rebound spring 5 so that rebound spring 5 is fixed to free spring seat 7.

Base portion 10 and inserted portion 11 of free spring seat 7 have a common inner lateral circumferential face which is clearance-fitted to an outer lateral surface 4a of piston rod 4 with a first lateral clearance δA. A tubular space is defined between the inner lateral peripheral surface of outer peripheral longitudinal extension 12 of free spring seat 7 and outer lateral surface 4a of piston rod 4. Outer peripheral longitudinal extension 12 of free spring seat 7 includes a chamfered inner lateral edge 12a at its upper longitudinal end. Specifically, chamfered inner lateral edge 12a is rounded. Thus, the outer diameter of the defined tubular space increases as followed upwardly.

An annularly-shaped elastic member 8 made of elastic material such as rubber, which is referred to as stopper rubber, is inserted into the defined tubular space inside outer peripheral longitudinal extension 12 of free spring seat 7, and press-fitted to the inner peripheral face of outer peripheral longitudinal extension 12 with a predetermined tightening margin by which the outer lateral periphery of stopper rubber 8 is larger in diameter than the inner lateral periphery of outer peripheral longitudinal extension 12. Stopper rubber 8 is arranged around outer lateral surface 4a of piston rod 4 for moving along piston rod 4 at least longitudinally of cylinder 1. The inner diameter of stopper rubber 8 is smaller than that of base portion 10 of free spring seat 7. Specifically, base portion 10 of free spring seat 7 is clearance-fitted to outer lateral surface 4a of piston rod 4 with a first lateral clearance δA, while stopper rubber 8 is clearance-fitted to outer lateral surface 4a of piston rod 4 with a second lateral clearance δB, where second lateral clearance δB is smaller than first lateral clearance δA. For example, first lateral clearance δA is equal to 1.8 mm, while second lateral clearance δB is equal to 0.2 mm.

Stopper rubber 8 includes a lateral projection 8a at the longitudinal center of its outer lateral periphery. Lateral projection 8a extends circumferentially along the outer lateral periphery of stopper rubber 8. In other words, the outer lateral periphery of stopper rubber 8 has chamfered edges at its upper and lower longitudinal ends. Lateral projection 8a of the outer lateral periphery of stopper rubber 8 is a little larger in diameter than the inner lateral surface of outer peripheral longitudinal extension 12 of free spring seat 7, under condition that stopper rubber 8 is off the free spring seat 7. For example, lateral projection 8a has a tightening margin of 0.1 to 0.7 mm with respect to the inner lateral surface of outer peripheral longitudinal extension 12 of free spring seat 7. The upper and lower inclined surfaces of the outer lateral periphery of stopper rubber 8 are smaller in diameter than the inner lateral surface of outer peripheral longitudinal extension 12 so as to be out of contact with outer peripheral longitudinal extension 12. Thus, stopper rubber 8 is press-fitted to free spring seat 7 in such a manner that only lateral projection 8a is in contact with the inner lateral surface of free spring seat 7.

Stopper rubber 8 includes three longitudinal protrusions 8b at the top and three longitudinal protrusions 8c at the bottom as shown in FIGS. 2 and 3. FIG. 2 shows a longitudinal section of stopper rubber 8 along the plane indicated by the line II-II in FIG. 3. Longitudinal protrusions 8b are arranged in the circumferential direction, and spaced evenly, opposite to free spring seat 7. Longitudinal protrusions 8c are arranged similarly, facing the free spring seat 7. Under condition that longitudinal protrusions 8c of stopper rubber 8 are in contact with the top surface of base portion 10 of free spring seat 7, longitudinal protrusion 8b is located above the tip of outer peripheral longitudinal extension 12 of free spring seat 7. In other words, stopper rubber 8 is larger in longitudinal length than outer peripheral longitudinal extension 12 of free spring seat 7. When the vehicle is at rest so that an associated vehicle wheel is in its neutral position, then stopper rubber 8 is positioned with a predetermined clearance to rod guide 9.

The following describes operations and effects of the cylinder apparatus according to the embodiment described above. When the associated vehicle wheel is rebounded so as to expand the shock absorber, then piston 3 moves upwardly within cylinder 1. Upon this, free spring seat 7 moves upwardly so as to come into contact with rod guide 9 through stopper rubber 8. When the associated vehicle wheel is further rebounded so that piston 3 further moves upwardly, then rebound spring 5 is compressed so as to generate a spring force. Stopper rubber 8 serves to reduce a noise resulting from a contact between free spring seat 7 and rod guide 9.

When the shock absorber is in its neutral position or contracted, the upper end of rebound spring 5 is not fixed and movable along piston rod 4. When rebound spring 5 vibrates in the lateral direction due to vibrations from the associated vehicle wheel, there is a possibility that free spring seat 7 vibrates in the lateral direction and collides with piston rod 4. However, according to the present embodiment, the construction that second lateral clearance δB between free spring seat 7 and outer lateral surface 4a of piston rod 4 is smaller than first lateral clearance δA between stopper rubber 8 and outer lateral surface 4a of piston rod 4, is effective for absorbing the vibrations, because stopper rubber 8 made of elastic material comes into contact with piston rod 4 and becomes elastically deformed before free spring seat 7 collides with piston rod 4. Thus, it is possible to minimize vibrations of rebound spring 5, and to prevent a noise resulting from a contact between free spring seat 7 and piston rod 4. Even if stopper rubber 8 becomes extremely deformed so as for free spring seat 7 to collide with piston rod 4, such soft collision generates no large noise.

If free spring seat 7 repeatedly collides with piston rod 4, such collision causes piston rod 4 to vibrate, because free spring seat 7 is made of resin with a specific hardness and a specific mass. Such vibrations may be transmitted through the upper bracket and the vehicle body to the interior space of the vehicle so as to cause abnormal sounds to passengers. When free spring seat 7 and piston rod 4 are focused on, the force between free spring seat 7 and piston rod 4 during collision is considered to be relatively small, because free spring seat 7 is made of resin with a small mass. However, in consideration of rebound spring 5, the force between free spring seat 7 and piston rod 4 during collision is considered to be relatively large, if rebound spring 5 is so long that the upper end of rebound spring 5 vibrates at a relatively high acceleration, or when rebound spring 5 has a large mass. Especially when rebound spring 5 is so long or so heavy, free spring seat 7 and stopper rubber 8 according to the present embodiment are significantly advantageous.

As described above, free spring seat 7 includes outer peripheral longitudinal extension 12 to which stopper rubber 8 is press-fitted from above. This makes it easy to mount stopper rubber 8 to free spring seat 7, as compared to the case where stopper rubber 8 is bonded to free spring seat 7.

As described above, stopper rubber 8 includes lateral projection 8a at the outer lateral periphery. This further makes it easy to mount stopper rubber 8 to free spring seat 7. This shape also results in reducing the mass of stopper rubber 8, and thereby results in reducing the material cost of stopper rubber 8, as compared to the case where stopper rubber 8 includes a thick outer lateral periphery. Stopper rubber 8 is symmetrical with respect to its central lateral plane. This makes it unnecessary to check the top and bottom of stopper rubber 8 before assembling. The provision of longitudinal protrusion 8c of stopper rubber 8 is effective for reducing the mass of stopper rubber 8 because stopper rubber 8 is in contact with the top surface of base portion 10 of free spring seat 7 at longitudinal protrusion 8c with a space between stopper rubber 8 and base portion 10.

The provision of rounded inner lateral edge 12a of outer peripheral longitudinal extension 12 makes it easy to guide stopper rubber 8 into position in the inner space defined by outer peripheral longitudinal extension 12.

It is considered to be possible that stopper rubber 8 drops from outer peripheral longitudinal extension 12 of free spring seat 7 while the shock absorber is expanding or contracting. In such a case, when the associated vehicle wheel is rebounded so as to expand the shock absorber, then free spring seat 7 moves upwardly to be in contact with stopper rubber 8 again and further moves upwardly so that the lower portion of stopper rubber 8 is inserted and positioned into the inner space of outer peripheral longitudinal extension 12. Then, free spring seat 7 moves stopper rubber 8 upwardly so that stopper rubber 8 comes into contact with rod guide 9. Finally, stopper rubber 8 is pressed between free spring seat 7 and rod guide 9 so that stopper rubber 8 is press-fitted again to outer peripheral longitudinal extension 12 of free spring seat 7.

In the present embodiment, base portion 10 and outer peripheral longitudinal extension 12 of free spring seat 7 are formed integrally with each other. Alternatively, base portion 10 may be provided separately from outer peripheral longitudinal extension 12. For example, outer peripheral longitudinal extension 12 is tubular, and base portion 10 is inserted upwardly into and press-fitted to the central hole of outer peripheral longitudinal extension 12 to form free spring seat 7. However, the integral formation of base portion 10 and outer peripheral longitudinal extension 12 leads to a decrease in the number of constituent parts, and makes it easy to assemble free spring seat 7 with piston rod 4 and rebound spring 5 with low assembling errors.

In the present embodiment, rebound spring 5 is movably supported at its upper end. Alternatively, rebound spring 5 may be movably supported at its lower end, and fixed at its upper end. Moreover, rebound spring 5 may be movably supported both at the upper end and at the lower end. In such alternative cases, free spring seat 7 and stopper rubber 8 according to the present embodiment may be applied to each free end. Especially when rebound spring 5 is movably supported at one end and fixed at the other end, the construction according to the present embodiment is more effective, because such construction may result in more tense vibrations in rebound spring 5.

Although the cylinder apparatus is in the form of a shock absorber of a wheeled vehicle in the present embodiment, but the present invention is not limited to such construction. The invention may be applied to any similar cylinder apparatus with a rebound spring.

This application is based on a prior Japanese Patent Application No. 2006-229115 filed on Aug. 25, 2006. The entire contents of this Japanese Patent Application No. 2006-229115 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A cylinder apparatus comprising:
   a cylinder;
   a piston mounted within the cylinder for sliding longitudinally of the cylinder;
   a piston rod coupled to the piston, and arranged to extend through one longitudinal end of the cylinder;
   a spring seat mounted within the cylinder, and clearance-fitted to the piston rod with a first lateral clearance for moving along the piston rod longitudinally of the cylinder, the spring seat including a longitudinal extension at one longitudinal end for defining a space between the longitudinal extension and the piston rod;
   a spring mounted around the piston rod within the cylinder, the spring having one longitudinal end fixed to another longitudinal end of the spring seat; and
   an elastic member retained in the defined space by the longitudinal extension of the spring seat, and clearance-fitted to the piston rod with a second lateral clearance for moving along the piston rod longitudinally of the cylinder, wherein
   the second lateral clearance is smaller than the first lateral clearance,
   the elastic member includes an outer lateral periphery larger in diameter than an inner lateral periphery of the longitudinal extension of the spring seat under condition that the elastic member is off the spring seat,
   the outer lateral periphery of the elastic member includes a lateral projection being in contact with the longitudinal extension of the spring seat, wherein the elastic member is out of contact with the longitudinal extension of the spring seat except the lateral projection, and
   in a longitudinal direction of the cylinder, the lateral projection of the outer lateral periphery of the elastic member is located substantially at a center of an entire portion of the elastic member that is clearance-fitted to the piston rod with the second lateral clearance.

2. The cylinder apparatus as claimed in claim 1, wherein the spring seat is integrally formed.

3. The cylinder apparatus as claimed in claim 1, wherein the longitudinal extension of the spring seat includes a chamfered inner lateral edge at a longitudinal end of the longitudinal extension.

4. The cylinder apparatus as claimed in claim 3, wherein the chamfered inner lateral edge of the longitudinal extension of the spring seat is rounded.

5. The cylinder apparatus as claimed in claim 1, wherein the piston rod includes one longitudinal end connected to a vehicle body so that the cylinder apparatus forms a shock absorber.

6. The cylinder apparatus as claimed in claim 1, wherein the elastic member is disposed between the spring seat and the one longitudinal end of the cylinder.

7. The cylinder apparatus as claimed in claim 1, wherein the spring seat is made of resin.

8. The cylinder apparatus as claimed in claim 1, wherein the spring seat is annularly shaped to extend around the piston rod.

9. The cylinder apparatus as claimed in claim 8, wherein the longitudinal extension is annularly shaped to extend circumferentially along an outer lateral periphery of the spring seat.

10. The cylinder apparatus as claimed in claim 1, wherein the elastic member is annularly shaped to extend circumferentially around the piston rod.

11. The cylinder apparatus as claimed in claim 1, wherein the elastic member is symmetrical with respect to a central lateral plane of the elastic member.

12. The cylinder apparatus as claimed in claim 1, wherein the elastic member is made of rubber.

13. The cylinder apparatus as claimed in claim 1, wherein the elastic member includes a first longitudinal protrusion opposite to the spring seat.

14. The cylinder apparatus as claimed in claim 13, wherein the elastic member includes second and third longitudinal protrusions opposite to the spring seat, and wherein the three longitudinal protrusions are circumferentially arranged and evenly spaced.

15. The cylinder apparatus as claimed in claim 1, wherein the elastic member includes a first longitudinal protrusion facing the spring seat.

16. The cylinder apparatus as claimed in claim 15, wherein the elastic member includes second and third longitudinal protrusions facing the spring seat, and wherein the three longitudinal protrusions are circumferentially arranged and evenly spaced.

17. The cylinder apparatus as claimed in claim 1, wherein the elastic member is press-fitted to the spring seat.

18. The cylinder apparatus as claimed in claim 1, wherein the elastic member is larger in longitudinal length than the longitudinal extension of the spring seat.

19. The cylinder apparatus as claimed in claim 1, wherein the second lateral clearance is a circumference clearance, such that a clearance is provided between the elastic member and the piston rod about an outer circumference of the piston rod.

* * * * *